United States Patent [19]
Panzer et al.

[11] 3,894,944
[45] July 15, 1975

[54] PROCESS FOR RAW WATER CLARIFICATION

[75] Inventors: Hans Peter Panzer, Stamford, Conn.; Kenneth Wayne Dixon, Ypsilanti, Mich.

[73] Assignee: American Cyanamid Company, Stamford, Conn.

[22] Filed: Feb. 25, 1974

[21] Appl. No.: 445,402

Related U.S. Application Data

[60] Continuation-in-part of Ser. No. 347,274, April 2, 1973, abandoned, which is a division of Ser. No. 233,622, Feb. 4, 1972, Pat. No. 3,738,945, which is a continuation-in-part of Ser. No. 115,556, Feb. 16, 1971, abandoned.

[52] U.S. Cl. .................................................. 210/54
[51] Int. Cl.² ........................................... C02B 1/20
[58] Field of Search .............. 210/10, 47, 52–54; 260/89.7 N

[56] References Cited
UNITED STATES PATENTS

| | | | |
|---|---|---|---|
| 2,173,069 | 9/1939 | Ulrich et al. | 260/247 |
| 2,753,372 | 7/1956 | Lundberg | 260/501 |
| 3,131,144 | 4/1964 | Nagan | 210/54 |
| 3,240,721 | 3/1966 | Fordyce | 260/2 |
| 3,259,570 | 7/1966 | Priesing et al. | 210/53 |
| 3,403,114 | 9/1968 | Vandenburg | 210/54 X |
| 3,493,502 | 2/1970 | Coscia | 210/54 |
| 3,567,659 | 3/1971 | Nagy | 260/2 |

FOREIGN PATENTS OR APPLICATIONS
1,111,144   7/1961   Germany

*Primary Examiner*—Thomas G. Wyse
*Attorney, Agent, or Firm*—William J. Van Loo

[57] ABSTRACT

Raw water is clarified when it is treated with an effective amount of a polyquaternary flocculant obtained from the reaction of an epoxy compound and a secondary amine until a solution viscosity of at least 100 centistokes at 25°C. is obtained as a 37% solids solution, by weight, based on the cationic portion of the polyquaternary compound.

6 Claims, 1 Drawing Figure

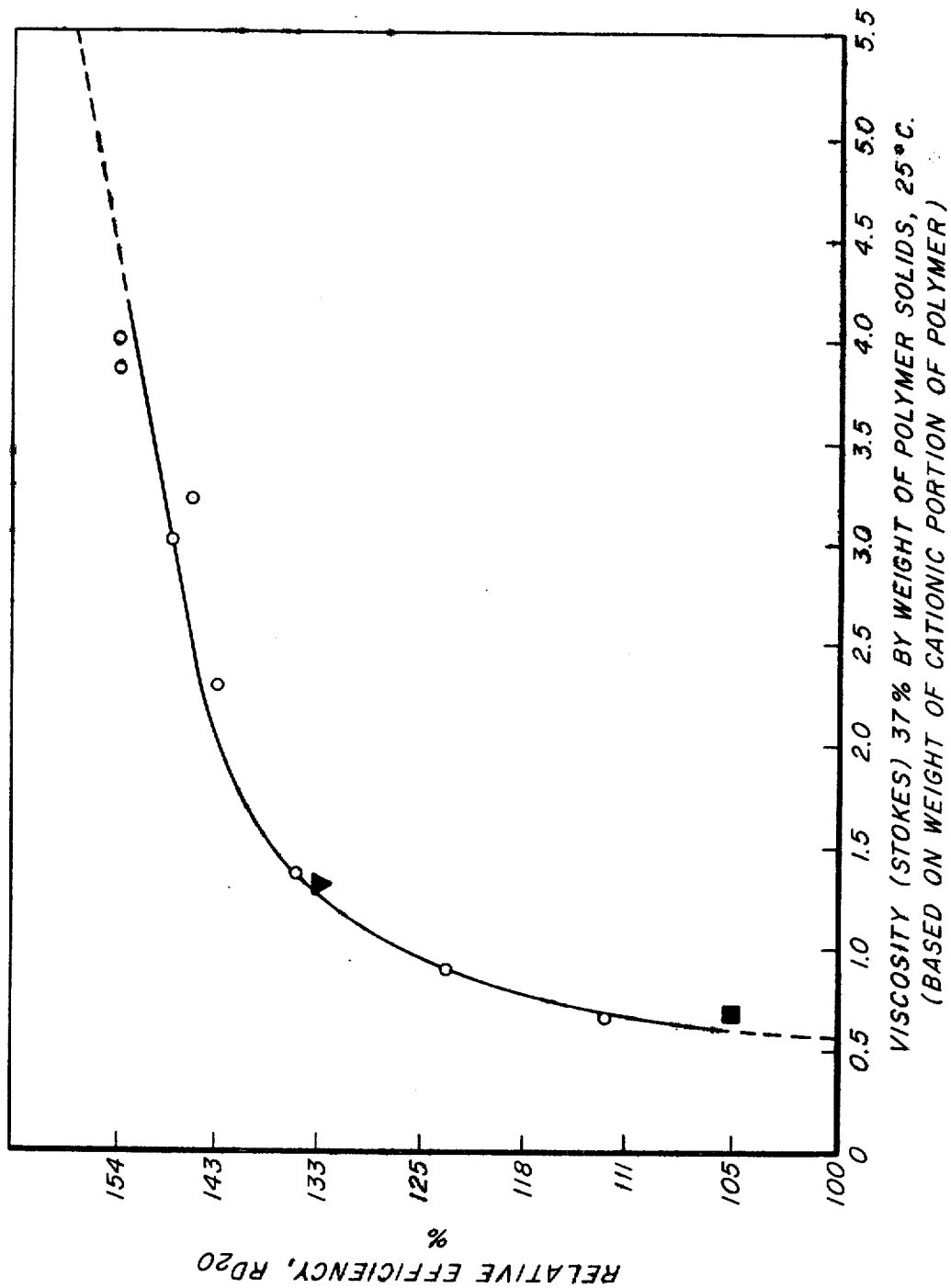

PROCESS FOR RAW WATER CLARIFICATION

This is a continuation-in-part of our copending application Ser. No. 347,274, filed Apr. 2, 1973 and now abandoned, which, in turn, is a division of our application Ser. No. 233,622; filed Feb. 4, 1972, now U.S. Pat. Mo. 3,738,945, issued June 12, 1973 which is a continuation-in-part of application Ser. No. 115556, filed Feb. 16, 1971, now abandoned.

This invention relates to an improved process for clarifying raw water. More particularly, this invention relates to such a process wherein the raw water being clarified is subjected to flocculation in removing suspended solids therefrom.

Flocculation of aqueous dispersions is an important operation. An aqueous dispersion is a system having at least two phases, one of which is a continuous outer aqueous phase and an inner disperse phase of fine suspended particles. In the case of raw water, the individual particles forming the disperse phase may not be distinctly visible but the water has a definite turbidity which affects its clarity. The clarity of the water, in turn, affects its attractiveness in various uses, such as for drinking water, for bathing, for industrial influent, and the like. The aqueous dispersions with which the present invention deals have disperse material which has a negative charge; and in the clarification of river water, for example for producing drinking water or industrial water, there is often chlorine present, which creates further problems.

The raw waters with which the present invention deals are natural waters derived from rain, snow, river, deep well, lakes, ponds, reservoirs, and the like. These waters frequently pick up solid particles which remain suspended therein. The particles may arise through flow of the water such as a river of through run off of rain or snow into the water such as a lake. In any case, these suspended particles can affect the clarity of the water and render it undesirable for the intended use.

In order to flocculate aqueous dispersions where the disperse phase has negative charges, it has been customary in the past to use materials such as alum, ferric salts, and the like which are transformed into the hydroxides or to use organic cationic flocculants which neutralize the negative charge. In those instances where the dispersions have been chlorinated, the chlorine reacts with the cationic flocculants and degrades them.

German Auslegeschrift 1,111,144, July 20, 1961, produces a polyquaternary by reacting dimethylamine with epichlorohydrin. The product is obtained by a cold reaction addition step in a dilute aqueous medium followed by a staged heating procedure and is described as a treating agent for dyed materials or as a dyeing assistant. No suggestion of use as a flocculant is made. The products are of low molecular weight as reflected in a viscosity when measured on the Gardner-Holdt scale at 25°C. and at 37% solids, by weight, based on the cationic portion of the polyquaternary compound, of 70 centistokes or less. While subsequent evaluation of the products as flocculants by the present inventors has shown some efficiency, the efficiency is considerably less than the polyquaternaries of the present invention and such evaluation was not suggested in the publication cited. The inventors of the German Auslegeschrift apparently were unaware of methods of increasing molecular weight of the polymer and, since the polymers they obtained were satisfactory for the use intended, were content not to go beyond the extent of polymerization actually achieved.

U.S. Pat. No. 2,454,547, Bock et al., Nov. 23, 1948, discloses preparation of polyquaternary compounds by reaction of secondary amines with epichlorohydrin. The compounds obtained are surface active and of such low molecular weight as not to be considered for use as flocculants. The compounds are prepared by use of expensive solvents, which use increases product costs and requires additional processing steps for solvent recovery.

In accordance with the present invention, there is provided a process for clarifying raw water which comprises treating said water with an effective amount of a water-dispersible polyquaternary polymer of essentially linear structure consisting essentially of the difunctional reaction product of a lower dialkylamine and a difunctional epoxy compound selected from the group consisting of epihalohydrins, diepoxides, precursors of epihalohydrins and diepoxides which under alkaline conditions are readily converted into the corresponding epoxy compounds, and mixtures thereof, said polyquaternary polymer containing repeating units of

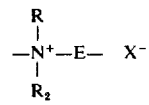

wherein R and $R_2$ are individually selected from the group consisting of alkyl of 1 to 3 carbon atoms; E is a residue obtained from said epoxy compound; the total amounts of reactants being substantially equimolar, the combination of which is such as to provide a polyquaternary compound which as a 37% aqueous solution, by weight, based on the cationic portion of said polyquaternary has a viscosity at 25°C. of at least 100 centistokes, and $X^-$ represents an ion forming the anionic portion of said polyquaternary compound; and thereafter recovering the clarified water.

The products of the present invention are superior flocculants to those of the prior art, providing rapid rates of flocculation in treating raw water. This is a particular advantage when short detention times are available for sedimentation of flocs formed in the water upon treatment. Often the available detention time of the treated water is limited and a quick-acting flocculant is desirable to provide settling of the flocs within the available time periods. By "detention time" is meant the time period during which flocculation can occur.

The polyquaternary compounds of the present invention, being the result of a polymerization reaction, are not obtained as simple single substances. Instead the products are obtained as a mixture varying in molecular weight as to individual species. Complicating characterization of the polymeric materials is the fact that ionic polyquaternary compounds are involved and characterization is influenced by the anionic portions present. To avoid these various problems, viscosity of aqueous solutions of the polyquaternary compounds is determined at concentrations expressed in terms exclusive of the anionic portion thereof to characterize the polymers and this property is known to correlate well with molecular weight of polymers. Throughout the specification and claims, therefore, the viscosity measurement reported is measured at 25°C. in aqueous medium at 37% polymer solids, by weight, based on the total weight of the cationic portion of the polyquaternary compound, that is to say the polymeric material minus its associated anion.

In preparing the various products used in the present invention, epoxy type reactants are employed. Epihalohydrins are used and are intended to include epichlorohydrin and epibromohydrin, for example. Longer chain epihalohydrins may also be used. Epichlorohydrin is preferred both from economic and reactivity aspects. Diepoxides, such as 1,4-butanediol-diglycidyl ether, a preferred diepoxide, are also useful. It is to be noted that epihalohydrins and diepoxides are bifunctional in reaction and this permits formation of essentially linear polymers. Precursors for epihalohydrins and diepoxides are also useful. For example, 1,3-dichloropropanol-2, a precursor for epichlorohydrin, may be used. Similarly, 1,4-dichloro-2,3-dihydroxybutane, the precursor for 1,3-butanediepoxide, may also be used. These precursors are readily converted into corresponding epoxy compounds under alkaline conditions in the preferred preparative method. Mixtures of the various epoxy reactants may also be employed. In forming the polymer, it is preferred to use an amount of epoxy type compound that is substantially equimolar to the amount of amine used. It can be readily appreciated that use of an excess of either reactant will lead to chain termination and will unduly limit the molecular weight of the polymer obtained.

Secondary amines useful in the preparative process include dimethylamine, preferred, diethylamine, dipropylamines, and secondary amines containing mixtures of alkyl groups having 1 to 3 carbon atoms. Secondary amines of higher carbon atom contents are generally sluggish in reaction due to steric effects of the substituents present therein. Thus, such amines not only require unduly long reaction times but may also interfere with quaternary formation. Mixtures of the amines recited above may also be employed. It is to be noted that secondary amines are bifunctional in reaction with the bifunctional epoxy type reactants, a first function provided by the hydrogen atom and a second function involving quaternarization of the nitrogen atom.

In carrying out the reaction of epoxy type compound with the secondary amine, addition of reactants may be in either order, i.e., the epoxy type compound may be added to the amine or the amine may be added to the epoxy type compound. Water is essential in preparing the reaction mixture and the amount of water is critical. Generally, the amount of water present will be in the range of about 10% to about 55%, by weight, based on the total weight of reactants and water. Absence of water presents problems in controlling the reaction and some water is necessary to effect reaction. The amount of water present also influences the degree of polymerization effected, as reflected in solution viscosity of the resulting polyquaternary compound, lower amounts of water resulting in polyquaternary compounds of higher solution viscosities at equal solids of the cationic portion of the polyquaternary compound. Thus, the ultimate degree of polymerization obtained in a given preparation will be influenced by the amount of water present in the reaction mixture, and for products of high solution viscosities in water at 37% solids, by weight, based on the total weight of the cationic portion of the polyquaternary compound, it is essential that the amount of water present in the reaction mixture be limited, as indicated, to avoid premature termination of the growing polymer chain by cyclization and hydrolysis occasioned by excessive water usage. In preferred instances, the amount of water present will be in the range of about 15% to 45% water, by weight, based on the total weight of reactants and water. In addition to water as the reaction medium, there may be used a water soluble alcohol in place of part of the water contemplated. It is generally preferred to use water alone, however, from an economic viewpoint.

The reaction of an epoxy type compound with secondary amine, such as dimethyl amine is exothermic, for example the reaction of epichlorohydrin with dimethylamine is exothermic to the extent of about 40 kilocalories per mole of epichlorohydrin initially. Accordingly, some care should be exercised to control the temperature during preparation of the reaction mixture. Use of water, as described above, is helpful. In addition, the rate of addition of reactants should be such as to keep the temperature in the range of about 20°C. to about 70°C. The addition may be of secondary amine to epoxy type compound dispersed or dissolved in water, of epoxy type compound to secondary amine dissolved in water, or any other suitable ramification of additions.

After the reaction mixture has been obtained, the reaction should be allowed to proceed at a suitable temperature until a polyquaternary compound is obtained which, as a 37% aqueous solution, by weight, based on the total solids of the cationic portion of the polyquaternary compound, has a viscosity of at least 100 centistokes at 25°C. In general, higher temperatures permit somewhat more rapid reaction, but the reaction of secondary amine and an epoxy type compound is quite rapid at about 50°C. and so temperatures from about 40°C. to 70°C. constitute a preferred practical range. High viscosities, i.e., in excess of 150 centistokes and as high as 200 and higher, under the same conditions of measurement, are possible since polyquaternary compounds are water soluble even at very high viscosities. For best performance in the use indicated, viscosities of 200 and more are highly desirable. Once the polyquaternary exhibits the desired viscosity, it is cooled, diluted if necessary, adjusted in pH as necessary, and removed from the reactor. In most instances, high solution concentrations are desirable in the product since they minimize freight charges per unit weight of real product. However, where high viscosities have been obtained, it may be desirable to dilute the product to facilitate handling.

In the preparation described above, the total usage of epoxy type reactant may be added during preparation of the reaction mixture. A preferred procedure, however, is to add the major portion of the epoxy type compound to be employed in preparing the reaction mixture and subsequently adding the additional epoxy type reactant in increments up to the level of usage contemplated. In this method of addition, each increment of epoxy type reactant is allowed to react prior to addition of further increments. This method of addition allows very high viscosities to be achieved in a relatively safe manner.

The amount of a particular polymer which is to be used depends upon the nature of the raw water to be treated and the solution viscosity of the polyquaternary compound. Generally, polymer usage will range from a few tenths of a part per million to about 100 or more parts per million based on the amount of water being treated. In any instance, the proper usage of flocculant will be that amount which is effective in the extent of clarification desired.

As can be readily appreciated, the nature of suspended solids in raw waters will vary depending upon their point of origin, the course of their travel, the comingling of other raw waters therewith, the discharge of treated wastes therein, and the like. The uses to be made of the raw waters may also vary, i.e., some may be intended for use as drinking water, others primarily for bathing, and still others for industrial purposes. The varying uses, to some extent, imply a difference in content of the raw water, and consequently tends to imply that the degrees of clarification desired may vary as well as the difficulties involved in clarification. Accordingly, it is not possible to specify the range of usage of polyquaternary flocculant with any degree of particularity because of the numerous variables mentioned. Thus, the polyquaternary flocculant should be used in effective amount, which is readily determined in use.

A convenient method of indicating the relative efficiency of a flocculant is by means of the so-called "jar tests". Although the test results do not always correlate well with actual data obtained in raw water clarification, they do indicate the relative flocculating abilities when short detention times are employed. These efficiency tests, which are measured relative to the cationic flocculant described in Comparative Example A below, are carried out as follows:

EFFICIENCY TESTS

A suspension of kaolin clay with negative charges on the particles in water is used as a standard test medium. A stock suspension of clay is made by mixing 25 grams of kaolin in a liter of deionized water for 24 hours and then allowing settling in a graduated cylinder for 24 hours. The upper portion is decanted such that the particle size of this fraction is not substantially in excess of 2 microns. This concentration is then diluted with water to yield a test water containing 70 parts per million of kaolin. One liter samples of the test water are placed in a six-place laboratory stirrer and varying amounts of the standard flocculant diluted to 30 milliliters are added with mixing being maintained at 100 rpm for one minute. This is followed by flocculation at 40 rpm for 15 minutes and settling for 15 minutes. The supernatant liquid is drawn off and analyzed for residual turbidity and electrophoretic mobility. The turbidities are plotted and the dosage taken where the turbidity is 20% of that for the untreated water. A similar series of tests is run on the sample of interest and the relative dosage compared to the standard is calculated. The dosage is that quantity of flocculant needed to produce a turbidity which is 20% of that of the untreated water and varies with the different flocculants. The dosage of standard flocculant divided by the dosage required of the flocculant of interest and multiplied by 100 represents the relative efficiency of the product of interest at a dosage level producing the turbidity of 20% of the untreated water, $RD_{20}$.

The sole FIGURE is a curve resulting from plotting the relative efficiencies of polyquaternary flocculants against viscosity of aqueous solutions thereof, viscosities being at 25°C. of solutions containing 37% solids, by weight, of the cationic portion of the polyquaternary compounds.

In all of the examples which follow, the parts are by weight unless otherwise specified and the water is deionized water. Also, where solids or polymer solids is referred to, it is by weight, based on the weight of the cationic portion of the polyquaternary and not the total weight of the polymer including anion. Viscosities are measured by the Gardner Holdt procedure.

COMPARATIVE EXAMPLE A

To 100 g. of methylamine (3.25 mols) dissolved in 400 g. of water in a reaction flask provided with stirrer, thermometer and reflux condenser are added 260 g. of epichlorohydrin (2.8 mols, equivalent to 0.87 mol per mol of amine) over 60 minutes, cooling (by ice bath) being applied as necessary to keep the temperature of the reaction mixture between 25°C.–40°C. at the first half of the reaction and at 50°C.–80°C. during the second half of the reaction. 160 g. of 36% aqueous sodium hydroxide solution (1.44 mol) at 85°C. are then added to the reaction mixture. The reaction mixture is then heated to 95°C. and epichlorohydrin is added in 1 ml. (1/214 mol) portions and the viscosity of the reaction mixture is followed by filling a 6 mm. (inside diameter) vertical glass tube with the hot solution and noting the number of seconds required for the level of the solution to fall 13 inches when the bottom of the tube is opened. Results are as follows:

| Time (Minutes)[1] | Ml. Epi. Added | Temp. (°C.) | Viscosity (Seconds)[2] |
|---|---|---|---|
| 110 | 1 | 95 | 4 |
| 115 | 1 | 95 | 5.5 |
| 123 | 1 | 95 | 10.0 |

[1]From start to reaction.
[2]Of reaction mixture, by glass tube method.

After 132 minutes, the reaction mixture becomes very viscous and the viscosity continues to rise. There is then added 274 g. of cold water containing 0.8 ml. of methylamine as reaction terminator, and the reaction mixture is heated to 94°C. The following viscosity changes occur:

| Time (Minutes)[1] | Temp. (°C.) | Viscosity (Seconds)[2] |
|---|---|---|
| 157 | 94 | 48 |
| 220 | 94 | 90 |
| 250 | 94 | 120 |
| 310 | 94 | 136 |
| 345 | 94 | 125 |
| 605 | 94 | 60 |

[1]From start of reaction.
[2]Of reaction mixture, by glass tube method

The reaction mixture, which as a pH of 8.7, is cooled, acidified to pH 6.3, and diluted with water. The product contains 19.3% polymer and has a viscosity of 900 centipoises at 20°C.

The solution is stable indefinitely at 70°F. and 135°F. both at pH 8.7 and 4.5.

EXAMPLE 1

A 500 ml. round bottom flask was equipped with condenser, mechanical stirrer, thermometer, addition funnel, and pH electrodes. To the flask were added 92.5 grams (1.0 mole) epichlorohydrin. To the addition funnel were added 112.5 grams of 40% aqueous dimethylamine (45.0 grams real, 1.0 mole). The amine solution was added to the epichlorohydrin with vigorous stirring over a period of one hour, keeping the temperature in the range of 20°–33°C. The clear solution resulting, containing 67% total polymer solids, was heated to 50°C. and held at that temperature for 6 hours. The product was then diluted to 37% solids with water and the viscosity determined to be 130 centistokes at 25°C. This value is represented by the triangle on the curve of the drawing. The product showed an efficiency of 135% relative to the product of Comparative Example A. On the same curve, the performance of the product of the German Auslegeschrift is represented as a square. The product, the preparation of which is described in Comparative Example B below, has a viscosity of 70 centistokes and an efficiency of 106% relative to the product of Comparative Example A. The efficiency of the product of the German Auslegeschrift is only 79% of that of Example 1. In other words, 1.3 parts of the product of the German Auslegeschrift is required to accomplish the same result as is obtained with 1 part of the product of Example 1. The solid portions of the curve of the drawing represent various efficiencies determined with polyquaternary compounds of the viscosities indicated. The dashed portions of the curve represent curve slope continuations beyond the actual range of study.

COMPARATIVE EXAMPLE B

The product of the German Auslegeschrift 1,111,144 was prepared as follows: 45 gm. of dimethylamine in the form of a 40% aqueous solution was introduced dropwise at a temperature of 0° to 5°C. into an emulsion of 92.5 gr. epichlorohydrin in 150 cc. of water, vigorous agitation was maintained. The reaction solution containing 38.8% total polymer solids was stirred for 6 hours at 15°–20°C. The reaction mixture, which then was still alkaline, was heated for 2 hours at 30°–35°C., and then 3 hours at 55°–60°C., and finally, 3.5 hours at 80°–85°C. The clear solution then showed a neutral pH. The viscosity at 37% solids of the cationic portion of the polymer was 70 centistokes.

The product was tested and the flocculation efficiency is shown by the square on the drawing. This represented about 106% of the standard compound as compared with 135% for the product of Example 1, while products of the present invention with increasing viscosity reach an efficiency of 156%.

EXAMPLE 2

To a 500 ml. flask equipped as before was added 138.53 g. epichlorohydrin (1.5 moles). To the addition funnel was added 112.73 g. 60% aqueous dimethylamine (67.64 g., 1.5 mole). The dimethylamine solution was added over 14 hours keeping the temperature at 20°–30°C. The viscous product containing 82.2% total polymer solids was then heated to 50°C. for 6 hours. On dilution to 37% solids of the cationic portion of the polymer, the product had a viscosity of 235 centistokes. A comparison of Examples 1 and 2 with Comparative Example B indicates the increased viscosity obtainable with increased solids of the reaction mixture.

EXAMPLE 3

This example illustrates the advantages of the products of the present invention in raw water clarification.

Using a standard sludge contact clarifier, raw water is treated with 50 parts per million of ferric chloride and 0.1 parts per million of an anionic flocculant which is a copolymer of 70% acrylamide and 30% acrylic acid. The resulting effluent has a turbidity in excess of 10 parts per million expressed in Jackson turbidity units.

Replacing both the ferric chloride and the anionic flocculant by 5 parts per million of the product of Example 2 produces effluent having a turbidity less than 10 parts per million expressed in Jackson turbidity units.

Thus, the product of the present invention produces reduced turbidity at greatly reduced usage of additives. In addition, the clarifier is able to operate at an increase in flow rate while providing the above advantages.

We claim:

1. A process for clarifying raw water which comprises treating said water with an effective amount of a water-dispersible polyquaternary polymer of essentially linear structure comprising the difunctional reaction product of dimethylamine and a difunctional epoxy compound selected from the group consisting of epihalohydrins and precursors of epihalohydrins which under alkaline conditions are readily converted into the corresponding epoxy compounds, and mixtures thereof, said polyquaternary compound containing repeating units of

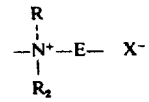

wherein R and $R_2$ are each methyl; E is a residue obtained from said epoxy compound; the total amounts of reactants being substantially equimolar, the combination of which is such as to provide a polyquaternary compound which as a 37% aqueous solution, by weight, based on the cationic portion of said polyquaternary compound has a viscosity at 25°C. of at least 100 centistokes; and $X^-$ represents an anion forming the anionic portion of said polyquaternary; and thereafter recovering the clarified water.

2. The process of claim 1 wherein the difunctional epoxy compound is epichlorohydrin.

3. A process for clarifying raw water which comprises treating said water with an effective amount of a water-dispersible polyquaternary polymer of essentially linear structure consisting essentially of the difunctional reaction product of dimethylamine and epichlorohydrin said polyquaternary polymer containing repeating units of

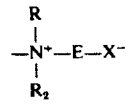

wherein R and $R_2$ are each methyl; E is a residue obtained from said epichlorohydrin; the total amounts of reactants being substantially equimolar, the combination of which is such as to provide a polyquaternary compound which as a 37% aqueous solution, by weight, based on the cationic portion of said polyquaternary compound has a viscosity at 25°C. of at least 100 centistokes; and $X^-$ represents a chloride ion forming the anionic portion of said polyquaternary; and thereafter recovering the clarified water.

4. The process of claim 3 wherein the viscosity is at least 150 centistokes.

5. The process of claim 3 wherein the viscosity is at least 200 centistokes.

6. The process of claim 3 wherein the viscosity is 235 centistokes.

* * * * *